(12) United States Patent
Huang et al.

(10) Patent No.: US 12,447,403 B2
(45) Date of Patent: Oct. 21, 2025

(54) IMAGE PROCESSING DEVICE AND IMAGE PROCESSING METHOD FOR GAME LOOP

(71) Applicant: MEDIATEK INC., Hsin-Chu (TW)

(72) Inventors: Tsung-Shian Huang, Hsinchu (TW); Huei-Long Wang, Hsinchu (TW); Yan-Hong Zhang, Hsinchu (TW); Chi-Chiang Huang, Hsinchu (TW); Kuo-Yi Wang, Hsinchu (TW); An-Li Wang, Hsinchu (TW); Chien-Nan Lin, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 345 days.

(21) Appl. No.: 18/135,751

(22) Filed: Apr. 18, 2023

(65) Prior Publication Data

US 2023/0338843 A1  Oct. 26, 2023

Related U.S. Application Data

(60) Provisional application No. 63/334,312, filed on Apr. 25, 2022.

(51) Int. Cl.
*A63F 13/00* (2014.01)
*A63F 13/52* (2014.01)
*G06T 7/20* (2017.01)
*G06T 19/00* (2011.01)

(52) U.S. Cl.
CPC .............. *A63F 13/52* (2014.09); *G06T 7/20* (2013.01); *G06T 19/00* (2013.01); *G06T 2200/24* (2013.01)

(58) Field of Classification Search
None
See application file for complete search history.

(56) References Cited

U.S. PATENT DOCUMENTS

| | | | |
|---|---|---|---|
| 8,494,058 B2* | 7/2013 | Chang | H04N 19/51 |
| | | | 348/452 |
| 10,230,920 B1* | 3/2019 | Yang | H04N 7/0127 |
| 11,503,247 B1* | 11/2022 | Chang | H04N 7/013 |
| 11,503,248 B1* | 11/2022 | Chang | H04N 7/014 |
| 11,812,066 B2* | 11/2023 | Bordes | H04N 19/85 |
| 12,277,766 B2* | 4/2025 | Meng | G10L 25/57 |
| 2006/0062306 A1* | 3/2006 | Ha | H04N 19/53 |
| | | | 375/E7.122 |

(Continued)

FOREIGN PATENT DOCUMENTS

| | | |
|---|---|---|
| CN | 113515249 A | 10/2021 |
| CN | 114268707 A | 4/2022 |

(Continued)

*Primary Examiner* — Paul A D'Agostino
(74) *Attorney, Agent, or Firm* — Winston Hsu (57) ABSTRACT

An image processing method for a game loop of a game, wherein the game loop comprises a game rendering module and a MEMC module, and is executed by more than one processing unit to generate an output image to display. The image processing method includes rendering, by the game rendering module, a scene of the game to obtain a first image; rendering, by the game rendering module, a UI to obtain a second image; applying, by the MEMC module, MEMC to the first image to generate an interpolated first image; and blending, by the MEMC module, the second image and the interpolated first image into the output image.

18 Claims, 10 Drawing Sheets

(56) References Cited

U.S. PATENT DOCUMENTS

| | | | | |
|---|---|---|---|---|
| 2011/0205438 A1* | 8/2011 | Blume | ............... | H04N 7/014 |
| | | | | 348/607 |
| 2011/0298987 A1* | 12/2011 | Tseng | ............... | H04N 5/145 |
| | | | | 348/E5.062 |
| 2014/0185679 A1* | 7/2014 | Lee | ............... | H04N 19/51 |
| | | | | 375/240.16 |
| 2015/0326923 A1* | 11/2015 | Chung | ............... | H04N 21/81 |
| | | | | 725/110 |
| 2017/0302973 A1* | 10/2017 | Tan | ............... | H04N 21/42607 |
| 2019/0052877 A1* | 2/2019 | Zhang | ............... | H04N 19/124 |
| 2019/0289327 A1* | 9/2019 | Lin | ............... | G06N 3/045 |
| 2021/0112241 A1* | 4/2021 | Hou | ............... | H04N 19/132 |
| 2021/0383505 A1* | 12/2021 | Pottorff | ............... | G06T 5/73 |
| 2021/0392346 A1* | 12/2021 | Holcomb | ............... | H04N 19/136 |

FOREIGN PATENT DOCUMENTS

| | | |
|---|---|---|
| CN | 114302092 A | 4/2022 |
| TW | 201947935 A | 12/2019 |

* cited by examiner

IMAGE PROCESSING DEVICE AND IMAGE PROCESSING METHOD FOR GAME LOOP

CROSS REFERENCE TO RELATED APPLICATIONS

This application claims the benefit of U.S. Provisional Application No. 63/334,312, filed on Apr. 25, 2022. The content of the application is incorporated herein by reference.

BACKGROUND

The game loop is a sequence of processes that runs continuously throughout gameplay. Traditionally, a game loop is divided into three distinct phases: processing inputs, updating the game status, and rendering the game content. The game content to be rendered is conventionally a combination of a 2D/3D main scene and a 2D user interface (UI). During the rendering phase, the main scene is drawn first, and then the 2D UI is superimposed so as to generate the final image for display.

Motion estimation and motion compensation (MEMC) is a technology in video processing that calculates the motion vectors of the corresponding position between two consecutive frames, and generates an additional estimated frame to increase the frame rate. Nowadays, MEMC algorithms are commonly used in many fields, such as video displays and game animations, to create a smoother visual experience. However, using the MEMC algorithm in game animations is not always effective, especially in the combination of the main scene and the UI. That is because, unlike the main scene, the UI is typically static and does not have motion, and therefore does not require interpolation or extrapolation.

As mentioned above, applying the MEMC algorithm to a fixed UI with a dynamic background (main scene) at the same time is difficult. To use the MEMC algorithm in this scenario, it is necessary to separate the UI from the background, which can involve modifying the game loop or game engine. For game studios with limited development capabilities, modifying the game engine can be an arduous task. Therefore, there is a need for a feasible solution to the problem.

SUMMARY

Therefore, the present invention is to provide a method of separation of the main scene and the UI with little modification of the game loop, so that the MEMC algorithm is able to achieve the desired effect on the game screen.

An embodiment of the present invention discloses an image processing method for a game loop of a game, wherein the game loop comprises a game rendering module and a motion estimation and motion compensation (MEMC) module, and is executed by more than one processing unit to generate an output image to display. The image processing method comprising rendering, by the game rendering module, a scene of the game to obtain a first image; rendering, by the game rendering module, a user interface (UI) to obtain a second image; applying, by the MEMC module, MEMC to the first image to generate an interpolated first image; and blending, by the MEMC module, the second image and the interpolated first image into the output image.

An embodiment of the present invention further discloses an image processing device. The image processing device comprises more than one processing unit, configured to execute a game loop of a game and generate an output image to display; and a storage unit, coupled to the more than one processing unit to store a program code of the game loop, wherein the game loop comprises a game rendering module and a motion estimation and motion compensation (MEMC) module, and is configured to instruct the more than one processing unit to execute an image processing method. The image processing method comprises rendering, by the game rendering module, a scene of the game to obtain a first image; rendering, by the game rendering module, a user interface (UI) to obtain a second image; applying, by the MEMC module, MEMC to the first image to generate an interpolated first image; and blending, by the MEMC module, the second image and the interpolated first image into the output image.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, hardware manufacturers may refer to a component by different names. This document does not intend to distinguish between components that differ in name but not function. In the following description and in the claims, the terms "include" and "comprise" are utilized in an open-ended fashion, and thus should be interpreted to mean "include, but not limited to". Also, the term "couple" is intended to mean either an indirect or direct electrical connection. Accordingly, if one device is coupled to another device, that connection may be through a direct electrical connection, or through an indirect electrical connection via other devices and connections.

Figure 1:
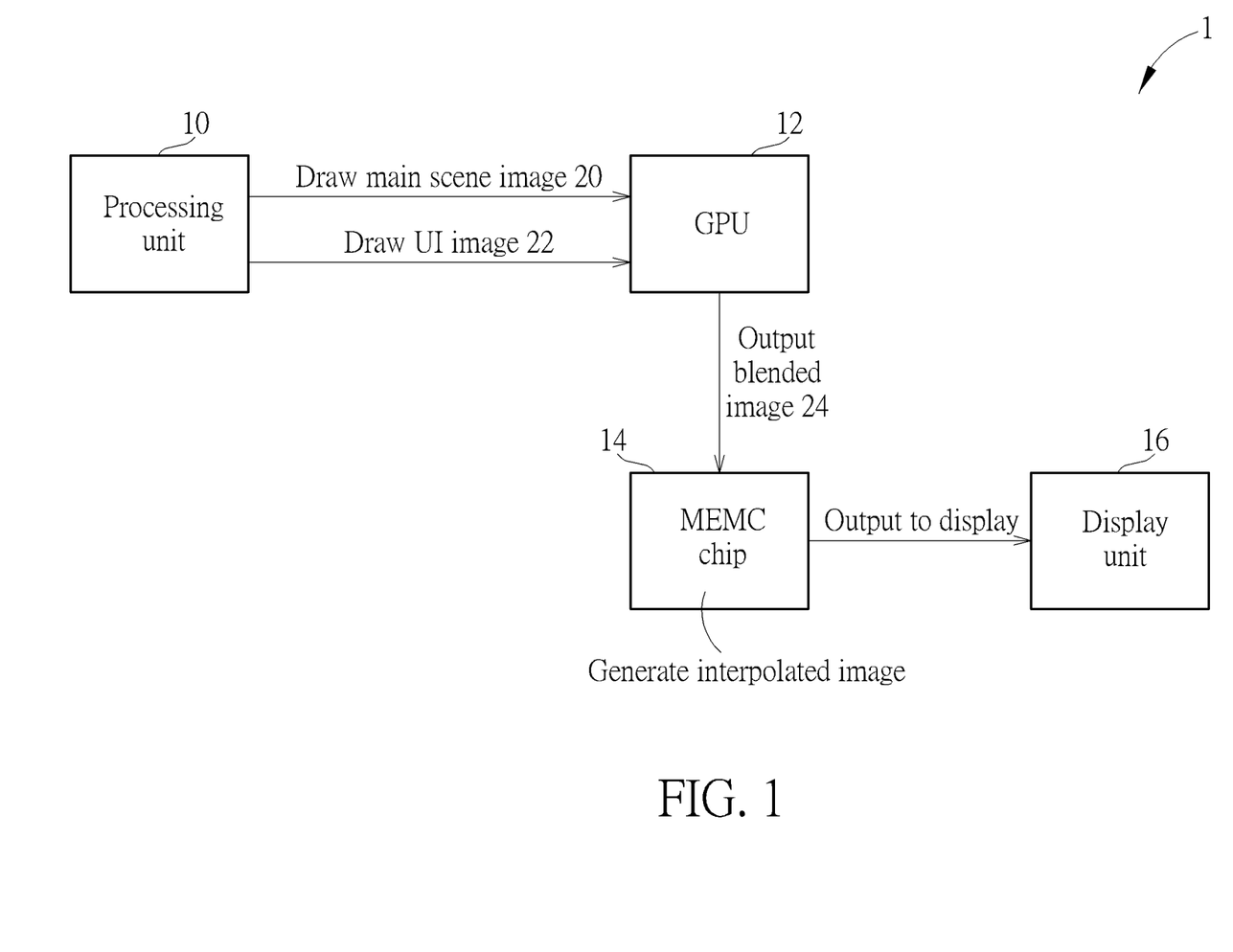
FIG. 1 is a schematic diagram of a system to apply MEMC method for a game according to a conventional way.
Figure 2:
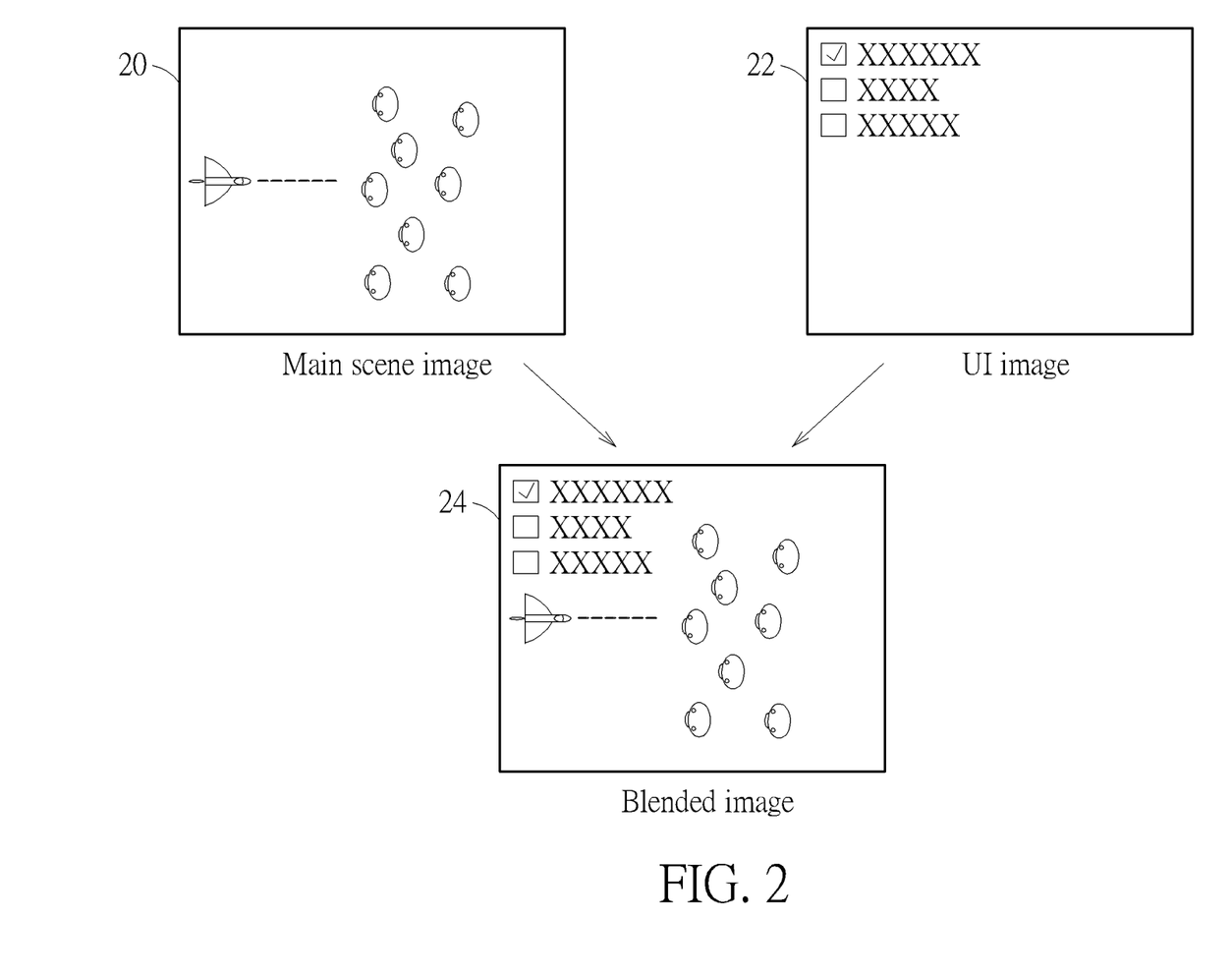
FIG. 2 is a schematic diagram showing a main scene image, a UI image and a blended image.

Please refer to FIG. 1, which is a schematic diagram of a system 1 for processing a game. The system 1 uses MEMC for the game in a conventional way and comprises a processing unit 10, a graphics processing unit (GPU) 12, an MEMC chip 14 and a display unit 16. The processing unit 10 executes a game loop and instructs the GPU 12 to render images required by the game loop. Specifically, the processing unit 10 instructs the GPU 12 to render an image of a scene of the game and an image of a user interface (UI). The GPU 12 follows the instructions to render the two images and blends the UI image with the scene image to generate a blended image. Please refer to FIG. 2, which is a schematic diagram showing a main scene image 20, a UI image 22 and a blended image 24 of the game processed by the system 1. In FIG. 2, the main scene image 20 is obtained by 2D or 3D rendering and is one of multiple consecutive frames that constitute the dynamic scene of the game. The content of the main scene image 20 is continuously updated as the game progresses. The UI image 22 is an image with opacity that provides a user interface for adjusting game settings. Compared to the main scene image 20, the UI image 22 usually has static content. The blended image 24 is a combination of the main scene image 20 and the UI image 22 generated by alpha blending, and is a final image presented to the user. In other words, the GPU 12 follows the instructions from the processing unit 10 to render the main scene image 20 and the UI image 22 to generate the blended image 24 based on the main scene image 20 and the UI image 22. The MEMC chip 14 then applies MEMC directly to the blended image 24 so as to generate an interpolated frame for output on the display unit 16.

In the system 1, the game loop is usually run by a game application (APP) through the processing unit 10. Using existing development tools provided by the game engine, game studios are able to effectively develop the game APP without considering details of screen display algorithms, such as computer graphics and visual optimization. However, in this situation, the MEMC chip 14 can only obtain the blended image 24 and not the main scene image 20 and the UI image 22 separately. As a result, MEMC may only be performed on the superimposed images (i.e. the blended image 24) obtained from the GPU 12, leading to distortion of UI components in the UI image 22.

Regarding this issue, the present invention proposes an image processing system and an image processing method to perform MEMC for a game loop of a game. The image processing method solves the above problems by slightly modifying the game loop, so that the main scene image 20 with dynamic content and the UI image 22 with static content may be processed separately before being blended into the blended image 24. The image processing method of the present invention not only prevents UI components from being distorted after MEMC, but also avoids the need to guess the content covered up by the UI using algorithms such as machine learning. At the same time, for game studios with limited development capabilities, the effect of MEMC may also be improved through such modifications. The image processing method of the present invention may be applied to any kinds of game engines such as OpenGL and Vulkan. The embodiments of the present invention take OpenGL as an example, but are not limited thereto.

Figure 3:
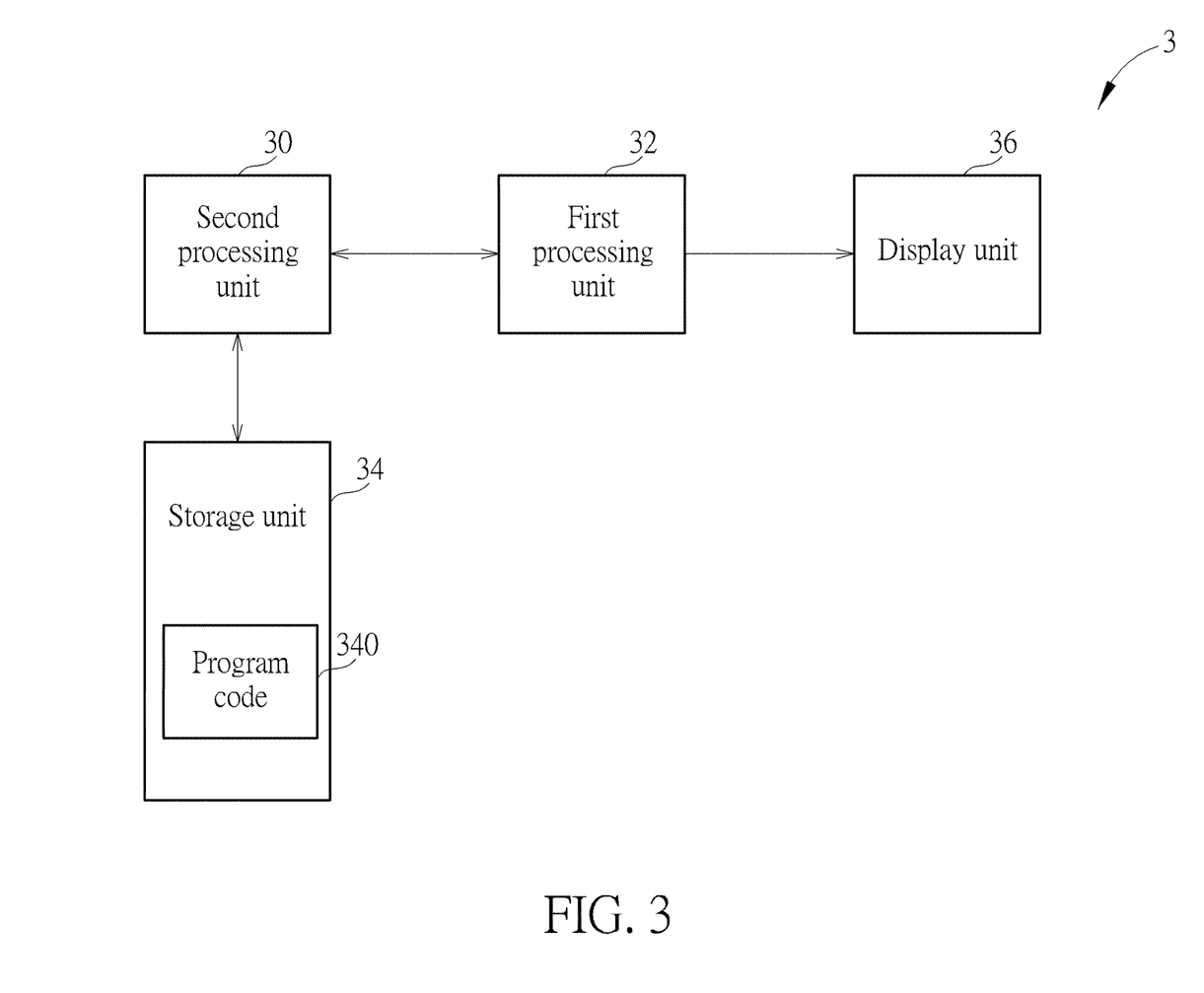
FIG. 3 is a schematic diagram of an image processing system according to an embodiment of the present invention.

Please refer to FIG. 3, which is a schematic diagram of an image processing system 3 according to an embodiment of the present invention. The image processing system 3 comprises a first processing unit 32, a second processing unit 30, a storage unit 34 and a display unit 36. The first processing unit 32 is coupled to the second processing unit 30 and the display unit 36, and the second processing unit 30 is coupled to the first processing unit 32 and the storage unit 34. Each of the first processing unit 32 and the second processing unit 30 may be a general-purpose processor, a microprocessor or an application-specific integrated circuit (ASIC). Specifically, the first processing unit 32 may be a GPU configured to manipulate computer graphics and image processing. The storage unit 34 may be any type of data storage devices for storing a program code 340, which is read and executed by the second processing unit 30. For example, the storage unit 34 may be a read-only memory (ROM), a flash memory, a random-access memory (RAM), a hard disk, an optical data storage device, a non-volatile storage unit, etc., and is not limited thereto. The display unit 36 may be an LCD/LED/OLED display, equipped in a TV, PC, notebook, mobile phone, and is not limited thereto. The image processing system 3 represents the necessary components to implement the embodiments of the present invention, and those skilled in the art may make various modifications and adjustments accordingly. For example, the first processing unit 32, the second processing unit 30 and the storage unit 34 may be combined and defined as an image processing device to cooperate with one or more display units.

The image processing method executed by the image processing system 3 is an MEMC processing method for game loop, which may be compiled into the program code 340, stored in the storage unit 34 and executed by the second processing unit 30. In the present embodiment, the rendering phase of the game loop may be divided into two parts: a game rendering module and an MEMC module. The game rendering module comprises instructions primarily provided by the game engine and is responsible for concretizing the content for screen display according to the game progress. The MEMC module comprises instructions for the first processing unit 32 to implement the MEMC algorithm.

Figure 4:
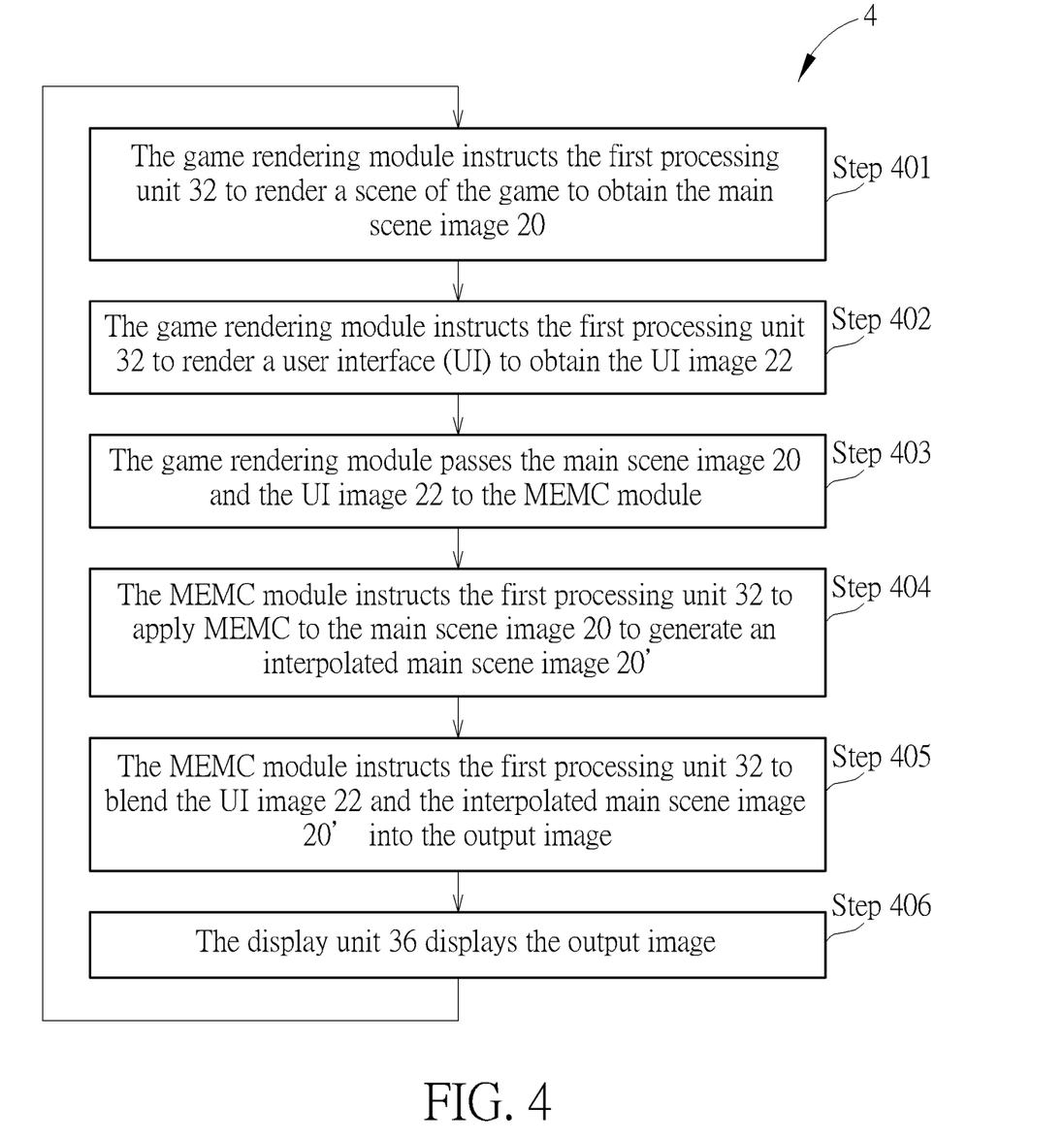
FIG. 4 is a schematic diagram of a process for image processing method according to an embodiment of the present invention.

The game rendering module instructs the first processing unit 32 to perform game rendering through instructions provided by the game engine, for example, to render the main scene image 20 and the UI image 22. The MEMC module is configured to apply MEMC algorithm to images rendered by the first processing unit 32. The MEMC module implements the software operation logic of the MEMC algorithm, and utilizes the internal format and internal information of the first processing unit 32 to accelerate the MEMC process, such as performing calculations about motion interpolation and motion compensation through the first processing unit 32 to obtain an interpolated image of the main scene image 20. The MEMC module may also instruct the first processing unit 32 to blend the UI image 22 and the interpolated image of the main scene image 20. The image processing method may be summarized as a process 4 shown in FIG. 4. The process 4 comprises the following steps:

Step 401: The game rendering module instructs the first processing unit 32 to render a scene of the game to obtain the main scene image 20.

Step 402: The game rendering module instructs the first processing unit 32 to render a UI to obtain the UI image 22.

Step 403: The game rendering module passes the main scene image 20 and the UI image 22 to the MEMC module.

Step 404: The MEMC module instructs the first processing unit 32 to apply MEMC to the main scene image 20 to generate an interpolated main scene image 20'.

Step 405: The MEMC module instructs the first processing unit 32 to blend the UI image 22 and the interpolated main scene image 20' into the output image.

Step 406: The display unit 36 displays the output image.

Figure 5:
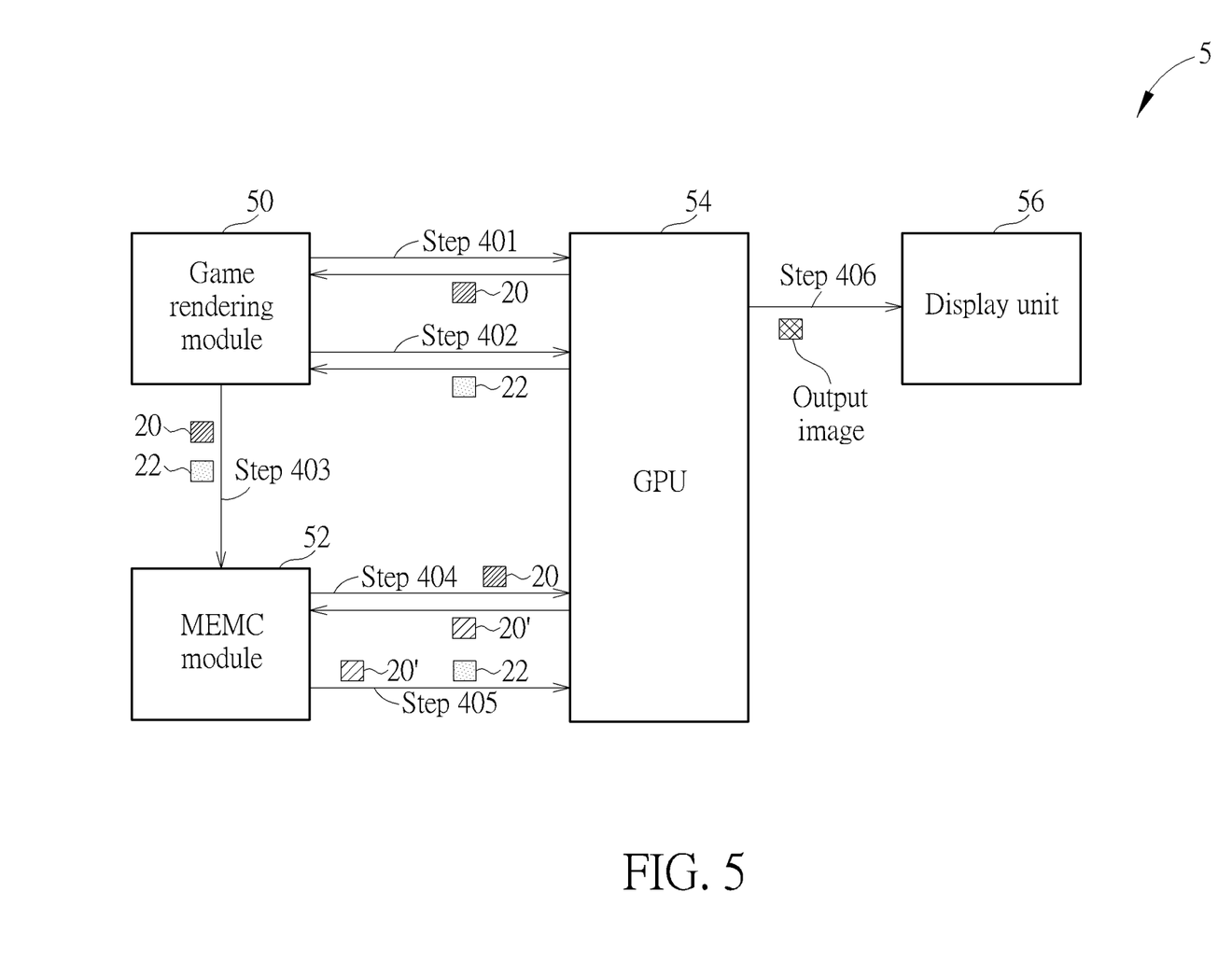
FIG. 5 is a schematic diagram of a logical architecture of an image processing system according to an embodiment of the present invention.

Please refer to FIG. 5, which is a schematic diagram of a logical architecture 5 of the image processing system 3 according to an embodiment of the present invention. In the logical architecture 5, a game rendering module 50 and an MEMC module 52 are executed by the second processing unit 30 in the game loop, and instruct a GPU 54 (the same as the first processing unit 32 in FIG. 3) to perform game graphic and MEMC algorithm to generate an interpolated image for display on a display unit 56. According to the process 4, the game rendering module 50 first instructs the GPU 54 to render a game scene and a UI to obtain the main scene image 20 and the UI image 22 (Steps 401, 402). Next, the game rendering module 50 passes the obtained main scene image 20 and UI image 22 to the MEMC module 52 for subsequent processing (Step 403). The MEMC module 52 instructs the GPU 54 to apply motion estimation and motion compensation to the main scene image 20 to generate the interpolated main scene image 20' (Step 404), and finally instructs the GPU 54 to blend the UI image 22 and the interpolated main scene image 20' into the output image (Step 405) for display on the display unit 56 (Step 406). This procedure prevents the static content of the UI image 22 from being distorted by the MEMC algorithm.

Figure 6:
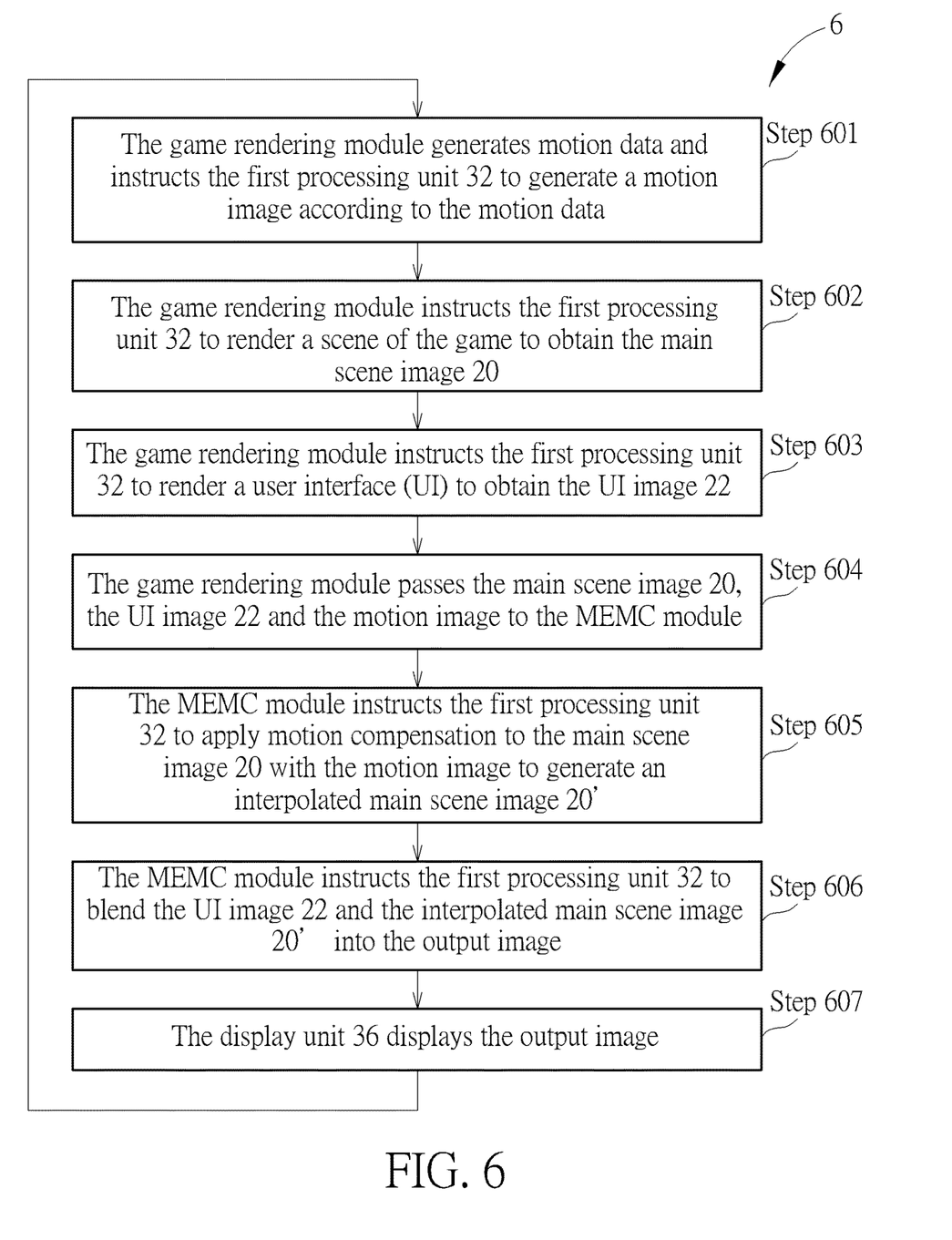
FIG. 6 is a schematic diagram of a process for image processing method according to an embodiment of the present invention.

Generally, the MEMC algorithm is divided into two parts: one part performs motion estimation based on two consecutive images in time to obtain motion data, such as motion vectors or a motion map, and the other part performs motion compensation based on the motion data to generate an interpolated image between two consecutive frames. The interpolated image may increase the frame rate of display to achieve a smoother visual experience. Rather than calculating the motion data using the GPU 54, an embodiment of the present invention provides a method to utilize the motion data provided by the game render module 50. The image processing method according to the embodiment may be compiled into the program code 340 and summarized as a process 6 shown in FIG. 6. The process 6 comprises the following steps:

Step 601: The game rendering module generates motion data and instructs the first processing unit 32 to generate a motion image according to the motion data.

Step 602: The game rendering module instructs the first processing unit 32 to render a scene of the game to obtain the main scene image 20.

Step 603: The game rendering module instructs the first processing unit 32 to render a UI to obtain the UI image 22.

Step 604: The game rendering module passes the main scene image 20, the UI image 22 and the motion image to the MEMC module.

Step 605: The MEMC module instructs the first processing unit 32 to apply motion compensation to the main scene image 20 with the motion image to generate an interpolated main scene image 20'.

Step 606: The MEMC module instructs the first processing unit 32 to blend the UI image 22 and the interpolated main scene image 20' into the output image.

Step 607: The display unit 36 displays the output image.

Figure 7:
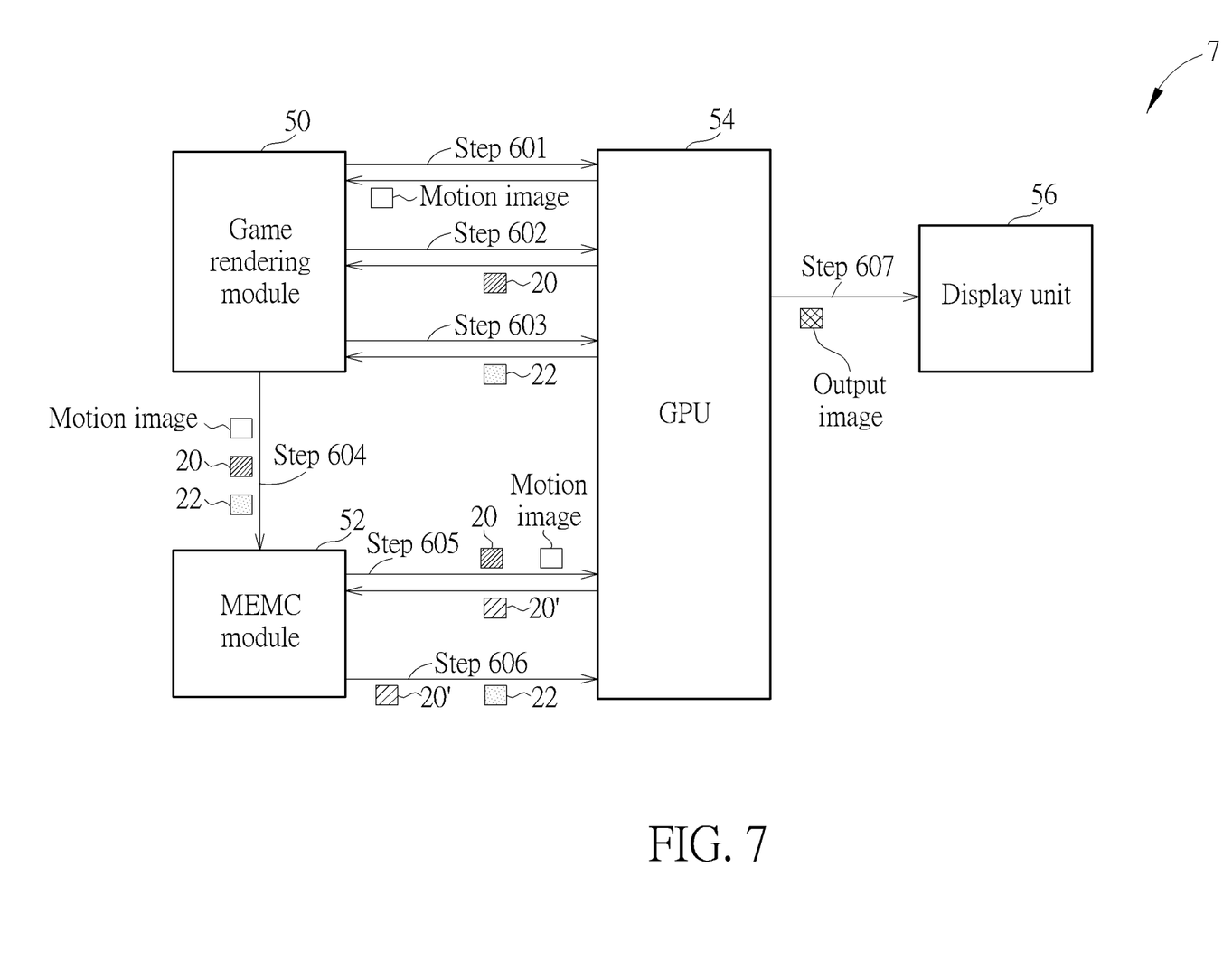
FIG. 7 is a schematic diagram of a logical architecture of an image processing system according to an embodiment of the present invention.

Please refer to FIG. 7, which is a schematic diagram of a logical architecture 7 of the image processing system 3 according to an embodiment of the present invention. In the logical architecture 7, the game rendering module 50 and the MEMC module 52 are executed by the second processing unit 30 in the game loop, and instruct the GPU 54 (the same as the first processing unit 32 in FIG. 3) to perform game graphic and MEMC algorithm to generate an interpolated image for display on the display unit 56. According to process 6, the game rendering module 50 not only instructs the GPU 54 to render a game scene and a UI to obtain the main scene image 20 and UI image 22 (Steps 602, 603), but also provides motion data that may be generated by the game engine (Steps 601). The game rendering module 50 may instruct the GPU 54 to generate a motion image with the format used by the GPU 54. The game rendering module 50 then passes the obtained motion image, main scene image 20 and UI image 22 to the MEMC module 52 for subsequent processing (Step 604). The MEMC module 52 instructs the GPU 54 to apply motion compensation to the main scene image 20 with the motion image to generate the interpolated main scene image 20' (Step 605), and finally instructs the GPU 54 to perform alpha blending on the UI image 22 and the interpolated main scene image 20' to produce the output image (Step 606) for display on the display unit 56 (Step 607). Compared with the motion data obtained by the GPU 54 through motion estimation, the motion data provided by the game rendering module 50 is more accurate, resulting in better MEMC performance in the embodiment.

Therefore, the present invention solves the problems that the UI components suffer from the distortion due to the MEMC by slightly modifying the game loop. Note that, FIG. 3 to FIG. 7 explain the embodiments of the present invention, which shows that two processing units work together to complete essential methods related to applying MEMC algorithm to a game loop. However, details such as graphics and calculation division between two processing units are not limited thereto, and those skilled in the art may make suitable variation or modification according to different requirements, software implementation methods, hardware architecture, and graphics acceleration support. For example, as mentioned in the above, the image processing method of the present invention may be applied to OpenGL game engine. Specifically, FIG. 8 is an example 8 of a pseudo code for OpenGL, which illustrates the process of the system 1 applying MEMC to a game loop in the conventional way.

Figure 8:
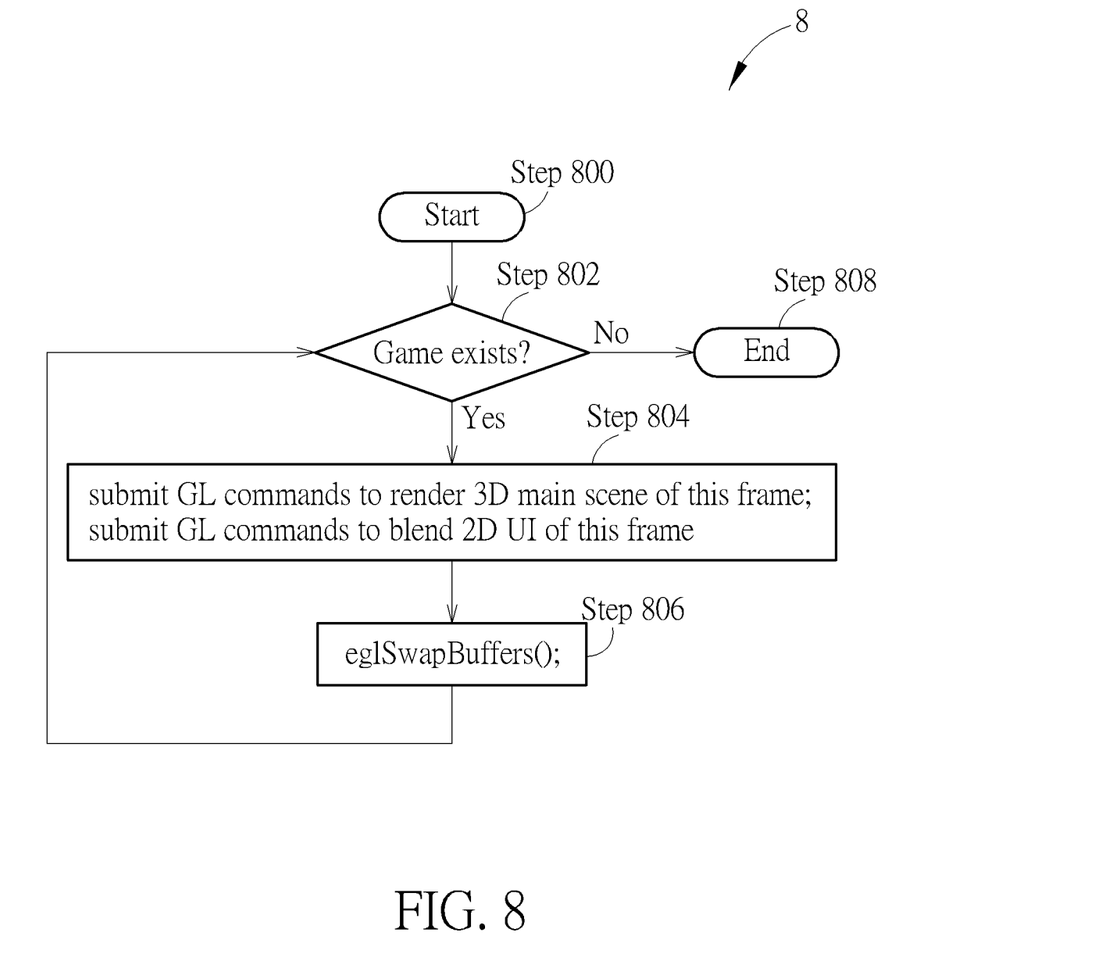
FIG. 8 is a schematic diagram of an example of a pseudo code for OpenGL according to a conventional way.

In the game loop of FIG. 8, the game application repeatedly instructs the GPU 12 to render and blend the main scene image 20 and the UI image 22 (Step 804). In this step, the content of main scene may be rendered in a FrameBuffer, and the content of UI may be rendered directly to the same FrameBuffer. The blended image 24 is then passed from the GPU 12 to the MEMC chip 14 to automatically apply the MEMC algorithm (Step 806) and finally displayed on the display unit 16. In such a conventional method, the output screen suffers from distortion of UI components in the UI image 22.

Figure 9:
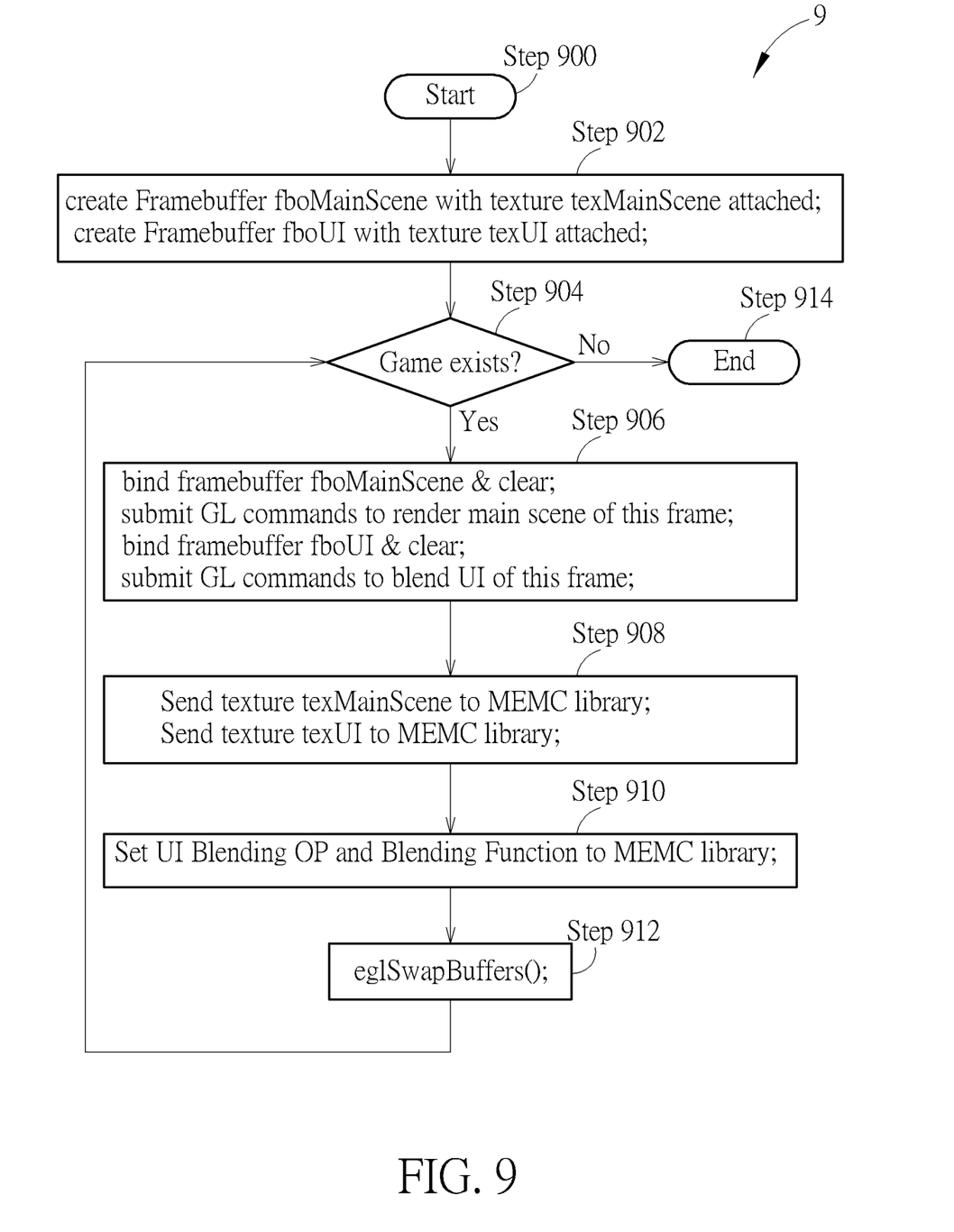
FIG. 9 is a schematic diagram of an example of a pseudo code for OpenGL according to an embodiment of the present invention.

Unlike the conventional system 1, the image processing system 3 of the present invention provides a different architecture (as shown in FIG. 5 and FIG. 7) and method for applying MEMC for the game. Specifically, FIG. 9 is an example 9 of a pseudo code for OpenGL, which illustrates a game loop according to the image processing method of the process 4. In the game loop of FIG. 9, the MEMC is only applied to the main scene image 22, and the motion data is computed by the first processing unit 32.

In the game loop of FIG. 9, the game rendering module 50 repeatedly instructs the GPU 54 to render a game scene and a UI to obtain the main scene image 20 and the UI image 22 (lines Step 906), which are then passed to the MEMC module 52 (Step 908) (i.e., the MEMC library). It should be noted that in the embodiment, only the main scene image 20 is subjected to MEMC. Therefore, different FrameBuffers (fboMainScene, fboUI) should be allocated to the main scene image 20 and the UI image 22 separately (Step 902). The MEMC module is responsible for instructing the GPU 54 to perform motion estimation and motion compensation on the main scene image 20 to obtain the interpolated main scene image 20', and for instructing the GPU 54 to blend the UI image 22 and the interpolated main scene image 20' (Steps 910, 912).

Figure 10:
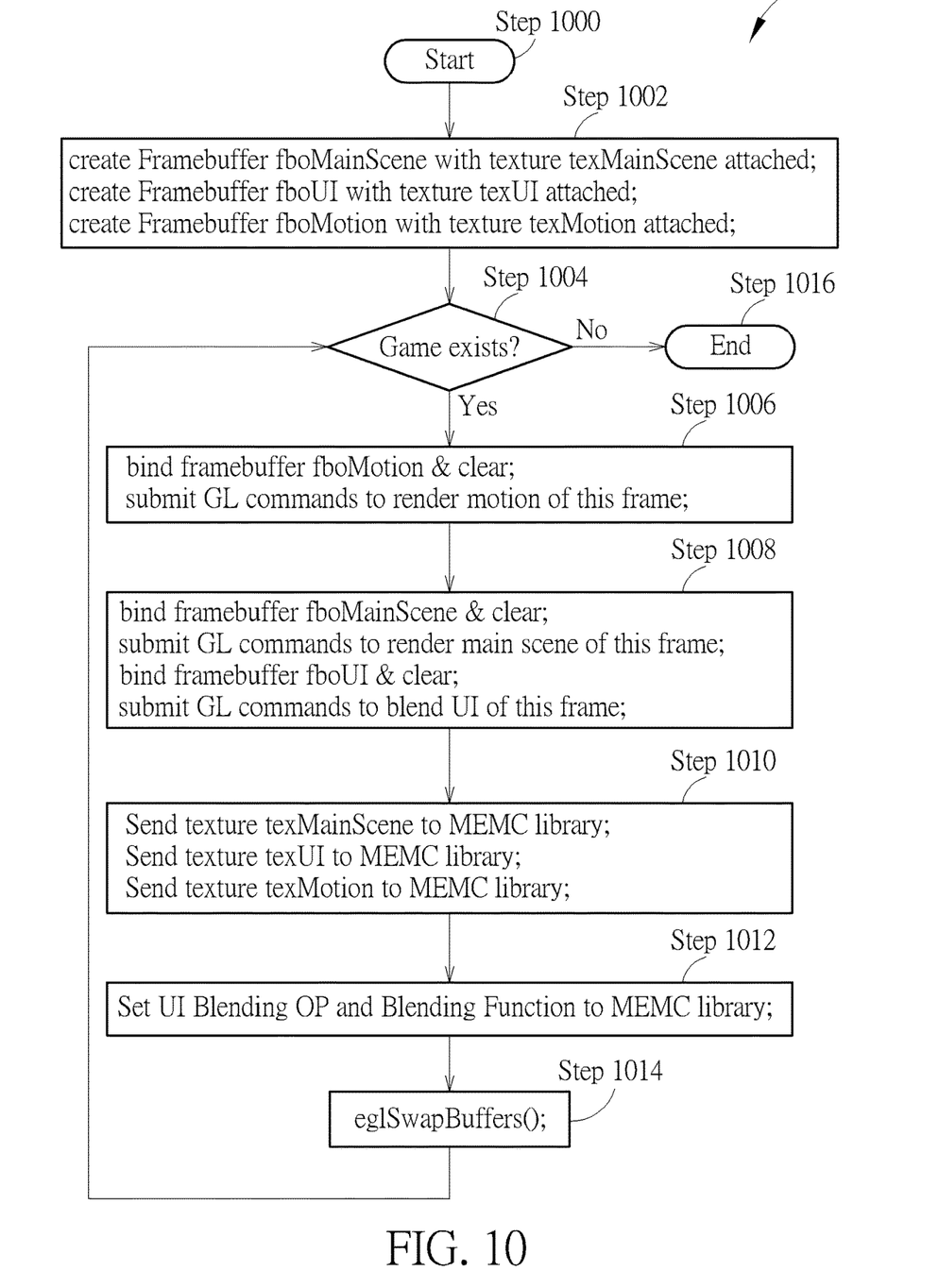
FIG. 10 is a schematic diagram of an example of a pseudo code for OpenGL according to an embodiment of the present invention.

FIG. 10 is another example 10 of a pseudo code for OpenGL, which illustrates a game loop according to the image processing method of the process 6. In the game loop of FIG. 10, the MEMC is only applied to the main scene image 22, and the motion data is provided by the second processing unit 30 (i.e. by the game rendering module 50).

In the game loop of FIG. 10, the game rendering module 50 repeatedly instructs the GPU 54 to render a game scene and a UI to obtain the main scene image 20 and the UI image 22 (Step 1008), and further provides the motion data of the main scene image 20 to the GPU 54 to generate a motion image (Step 1006). Then, all of the motion image, the main scene image 20 and the UI image 22 are passed to the MEMC module 52 (Step 1010) (i.e., call the MEMC library). Similar to the previous embodiment, only the main scene image 20 is subjected to MEMC. Therefore, different FrameBuffers (fboMainScene, fboUI) should be allocated to the main scene image 20 and the UI image 22 separately (Step 1002). It should be noted that, because the game rendering module 50 instructs the GPU to generate the motion image, another FrameBuffers (fboMotion) is allocated to store the motion data for subsequent processing (Step 1002). The MEMC module 52 is responsible for instructing the GPU 54 to apply motion compensation to the main scene image 20 with the motion image to obtain the interpolated main scene image 20', and for instructing the GPU 54 to blend the UI image 22 and the interpolated main scene image 20' (Steps 1012, 1014).

The game loops in the examples 8-10 show the way to breakdown the rendering phase of the game loops and to modify the game loop to apply MEMC with a little effort. With the image processing methods of the present invention, game studios do not need to consider how to apply MEMC logic, as long as the information related to the main scene and UI are rendered in different textures and then pass to the MEMC module 54 separately. The method of modifying the game loop is not limited to OpenGL, and the concept could be applied to any existing game engines.

In summary, the present invention provides image processing methods and image processing device to solve the problems that the UI components suffer from the distortion due to the MEMC by slightly modifying the game loop. Through separating UI from the output image, it's not necessary to guess the hidden information of the main scene covered up by the UI, which achieves a more ideal MEMC effect.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An image processing method for a game loop of a game, wherein the game loop comprises a game rendering module and a motion estimation and motion compensation (MEMC) module, and a program of the game loop is stored in a non-transitory computer-readable medium and executed by more than one processing unit to generate an output image to display, the image processing method comprising:
    rendering, by the game rendering module, a scene of the game to obtain a first image;
    rendering, by the game rendering module, a user interface (UI) to obtain a second image;
    applying, by the MEMC module, MEMC to the first image to generate an interpolated first image; and
    blending, by the MEMC module, the second image and the interpolated first image into the output image to display.

2. The image processing method of claim 1, wherein one of the more than one processing unit is a graphics processing unit (GPU).

3. The image processing method of claim 1, wherein the first image is obtained by 2D or 3D rendering of the scene of the game.

4. The image processing method of claim 1, wherein the second image is an image with opacity.

5. The image processing method of claim 1, wherein the step of applying the MEMC to the first image to generate the interpolated first image comprises:
    performing, by the MEMC module, motion compensation to generate the interpolated first image according to a motion data and the first image.

6. The image processing method of claim 5, wherein the step of obtaining the motion data comprises performing motion estimation to obtain the motion data.

7. The image processing method of claim 5, wherein the game rendering module or the MEMC module provide the motion data.

8. The image processing method of claim 5, wherein the motion data comprises a plurality of motion vectors of the first image.

9. The image processing method of claim 1, wherein the step of blending the second image and the interpolated first image into the output image comprises performing an alpha blending to blend the second image and the interpolated first image.

10. An image processing device, comprising:
    more than one processing unit, configured to execute a game loop of a game and generate an output image to display; and
    non-transitory computer-readable medium, coupled to the more than one processing unit to store a program code of the game loop, wherein the game loop comprises a game rendering module and a motion estimation and motion compensation (MEMC) module, and is configured to instruct the more than one processing unit to execute an image processing method, and the image processing method comprises:
    rendering, by the game rendering module, a scene of the game to obtain a first image;
    rendering, by the game rendering module, a user interface (UI) to obtain a second image;
    applying, by the MEMC module, MEMC to the first image to generate an interpolated first image; and
    blending, by the MEMC module, the second image and the interpolated first image into the output image.

11. The image processing device of claim 10, wherein one of the more than one processing unit is a graphics processing unit (GPU).

12. The image processing device of claim 10, wherein the first image is obtained by 2D or 3D rendering of the scene of the game.

13. The image processing device of claim 10, wherein the second image is an image with opacity.

14. The image processing device of claim 10, wherein the step of applying the MEMC to the first image to generate the interpolated first image comprises:
   performing, by the MEMC module, motion compensation to generate the interpolated first image according to a motion data and the first image.

15. The image processing device of claim 14, wherein the step of obtaining the motion data comprises performing motion estimation to obtain the motion data.

16. The image processing device of claim 14, wherein the game rendering module or the MEMC module provides the motion data.

17. The image processing device of claim 14, wherein the motion data comprises a plurality of motion vectors of the first image.

18. The image processing device of claim 10, wherein the step of blending the second image and the interpolated first image into the output image comprises performing an alpha blending to blend the second image and the interpolated first image.

* * * * *